Dec. 13, 1949   H. C. EARLY ET AL   2,491,169
LARGE THROAT PORTABLE WELDER

Filed June 6, 1945   2 Sheets-Sheet 2

Inventors
Harold C. Early &
William G. Dow

By Blackmore, Spencer & Flint
Attorneys

Patented Dec. 13, 1949

2,491,169

UNITED STATES PATENT OFFICE 2,491,169

LARGE THROAT PORTABLE WELDER

Harold C. Early, Beaverton, and William G. Dow, Ann Arbor, Mich., assignors to General Motors Corporation, Detroit, Mich., a corporation of Delaware Application June 6, 1945, Serial No. 597,812

2 Claims. (Cl. 171—119)

This invention relates to welding means and more particularly to a new and novel method of transforming current and novel welding transformer design.

Welding equipment has been in the past cumbersome and heavy which made it expensive to build and operate and difficult to move from place to place. One manner in which smaller or lighter equipment can be provided to perform welds is to utilize units having small electrical and mechanical throats to reduce the inductive load in which case a lighter transformer is required for application of power and the unit may therefore be smaller, more inexpensive to operate and portable. However, the smallness of the throat may be a severe limitation on the uses to which the device may be put.

It is therefore an object of our present invention to provide relatively light welding means incorporating a transformer containing little or no iron, yet permitting a relatively large throat for application of material.

It is a further object of our invention to provide a new method of current transformation and delivery to welding electrodes by which only a small voltage is required to be delivered from the transformer in order to cause a large welding current to flow.

It is a still further object of our invention to provide a portable welding means utilizing a new principle of transformer flux inter-linkage.

It is a still further object of our invention to provide a welding device in which the transformer kva. is relatively small as compared with existing welding devices for similar service.

It is a still further object of our invention to provide portable welding means having a relatively large throat in which a dummy primary transformer winding is used.

With these and other objects in view which will become apparent as the specification proceeds, our invention will be best understood by reference to the following specification and claims and the illustrations in the accompanying drawings, in which:

We have discovered that if the magnetic flux in the welder throat forms a part of the mutual magnetic coupling between the primary and secondary windings that this added effectiveness of the transformer provides a sufficient decrease in iron to reduce secondary inductance load and enable the construction of a much larger throat and more general utility of the equipment. To illustrate the above principle we refer to Figure 4 in which the primary winding is shown at 2 and the secondary winding at 4, the secondary winding terminating in welding electrodes 6 and 8 applicable to two work sheets 10 and 12 to be secured together. In this instance it will be noted that the primary extends beyond the secondary to substantially twice the distance thereof and the portion of the primary turns adjacent the secondary are located in close proximity thereto throughout the extent of the secondary throat and thus provide a high mutual inductance between primary and secondarly over this portion.

In order to permit insertion of the work sheets 10 and 12 which might extend beyond the electrodes to the left, the primary is looped out away from said electrodes and that portion of the primary extending to the left of the electrodes 6 and 8 is referred to as the dummy primary winding and its only purpose is to complete the loop and at the same time provide a relatively large throat for the insertion of material. Its flux has no substantial inter-linkage with the secondary coil. With this construction it will be evident that we provide a very high mutual inductance between the right hand or main portion of the primary and the complete secondary coil including the throat. The effect of this construction is to transfer the throat inductance from the secondary back into the primary and the throat of the welder now constitutes the air core of the transformer. The mutual inductance is nearly equal to the secondary inductance, and the inductance of the secondary circuit external to the mutual inductance is extremely small. Thus the inductance of the dummy primary is the controlling factor. In order to improve the flux inter-linkage or transfer between the righthand portion of the primary coil and the secondary, iron laminations can be applied to that section if desired. A small amount of iron makes a substantial improvement in this instance.

Figure 3:
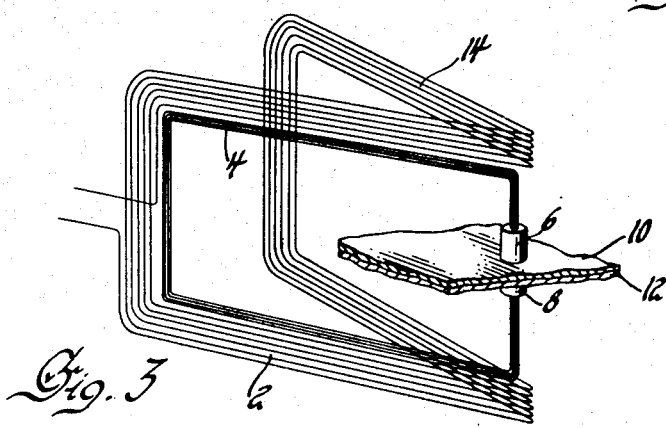
Figure 4:
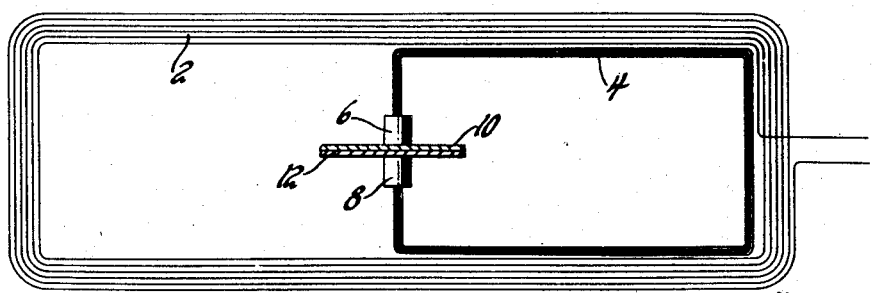

Using a design of this construction, however, one can see that the operator is still limited in the size of the material which can be applied to the electrodes as it must still pass through the primary loop and in order to improve this mechanical situation the portion of the primary to the left of the electrodes 6 and 8 in Figure 4 may be bent back upon the remainder as shown in Figure 3 in which instance that section 14 of the primary 2 or the dummy primary is shown bent back to a V-shaped angle with the original primary coil. The secondary 4 as in the prior instance still lies within the first half of the primary coil and feeds the welding electrodes 6 and 8 but in this instance a large sheet or corner of a sheet may be fed between the electrodes without its insertion through the total primary coil. The portion 14 however can not be folded back too far for if that occurs the flux from the dummy portion 14 will link with the secondary in a reverse order from the flux in the first portion of the primary and will tend to reduce the mutual coupling. Such an effect can however be best compensated by placing an iron core around the portions 2 and 4 of the primary and secondary to concentrate this mutual inductance and of course this will tend to decrease any effect that portion 14 might have on the same.

Figure 2:
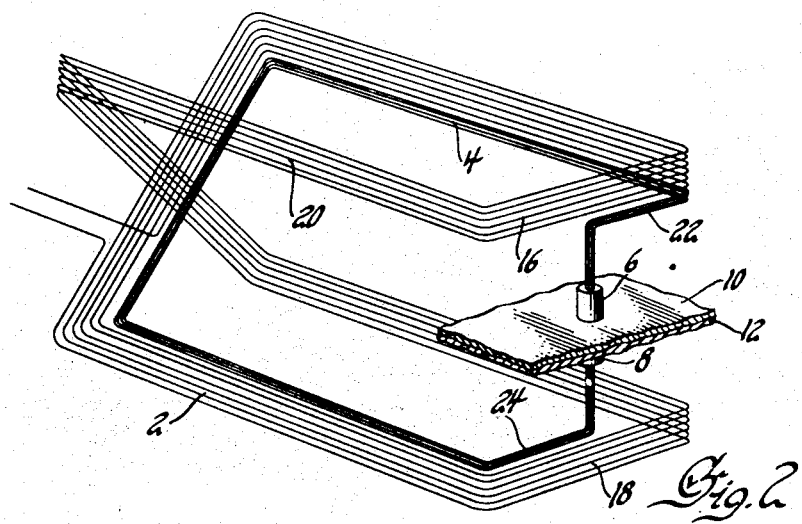
Figures 2, 3 and 4 are diagrammatic schematic views of the transformer windings disclosing the theory of transformer design incorporated in the portable welder shown in Figure 1.

Figure 2 shows another method in which the dummy portion of the primary may be folded back upon the secondary and first portion of the primary to provide a satisfactory gap for relatively large pieces and still avoid any reduction in the mutual inductance by setting up reverse fields. Broadly, dummy portion 14 as shown in Figure 3 is twisted at right angles to the original primary section in the showing in Figure 2 to provide a construction in which there will be no flux inter-linkage since the two are at right angles. In Figure 2 the original portion of the primary 2 still lies closely aligned with the secondary 4. However, a section of this primary 2 is now bent at right angles to the same as shown in section 16 at the top and 18 at the bottom to provide two horizontal parallel portions. The remainder of the primary consists of a rectangular section 20 which extends back parallel to the original sides 2 but spaced therefrom and so crosses the original primary coil at right angles in connecting the ends of horizontal sections 16 and 18. The turns however are continuous from the main primary through the dummy primary and back through the main primary etc. as in Figure 4. Thus, there are provided two coils connected by portions 16 and 18 which create fields at right angles which therefore have no magnetic inter-linkage. The secondary coil 4 lying within the original portion 2 has two shorter horizontal sections 22 and 24 which lie adjacent a portion of the primary coils 16 and 18 and again are connected to electrodes 6 and 8. In this manner the same type of gap or throat is provided as shown in Figure 3 but magnetic inter-linkage between the dummy portion 20 and the remainder of the primary is prevented. Iron, of course, can be used to shroud the portion 2 of the primary and secondary 4 to increase efficiency if desired.

Figure 1:
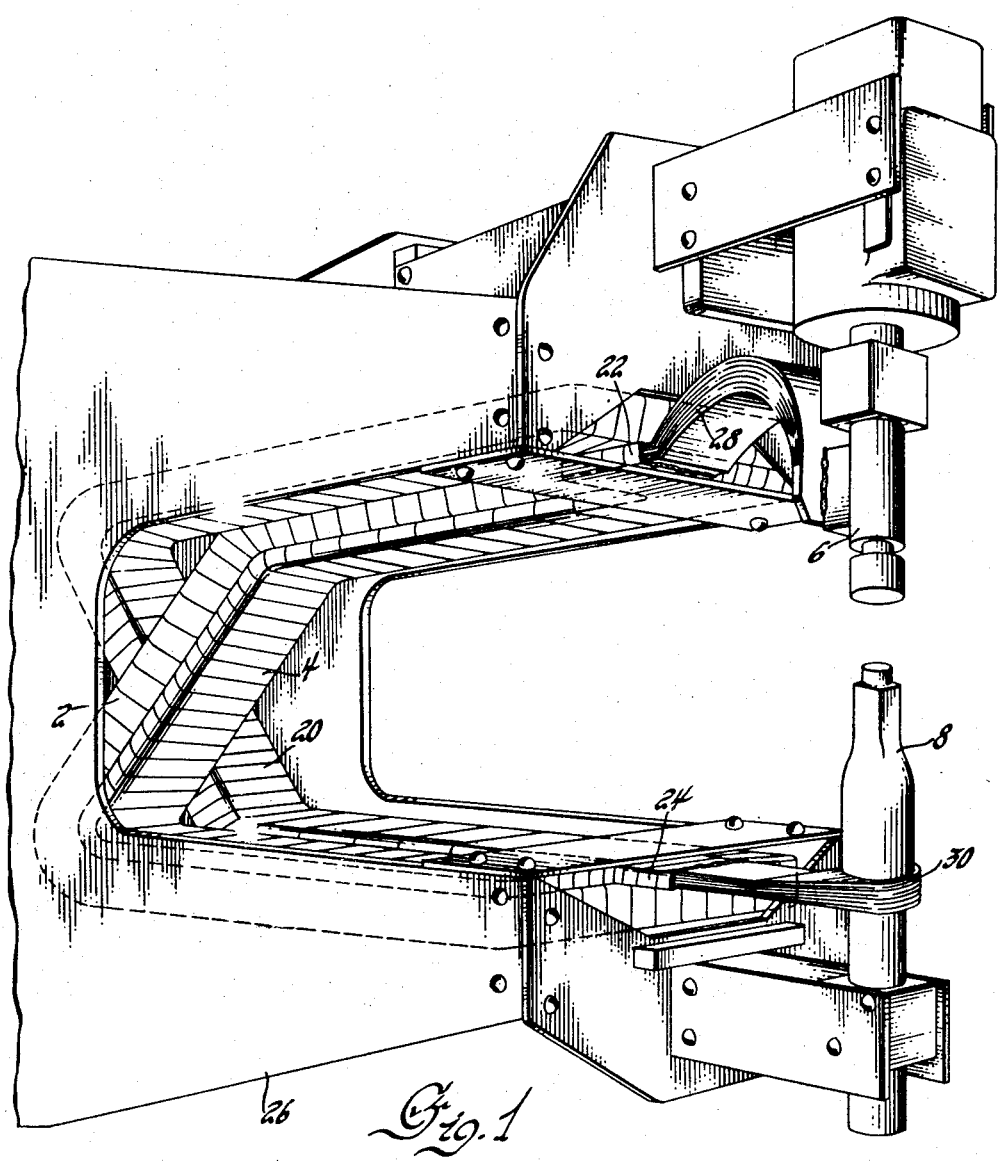
Figure 1 is a perspective view of a portable welder utilizing a construction of our invention.

The construction shown in Figure 2, that of primary coils at right angles, is that shown actually incorporated into a portable welding machine in Figure 1 in which instance a frame work 26 is provided for supporting the windings and the two electrodes 6 and 8 between which the work is to be applied. Means for moving the upper electrode 6 downwardly to clamp the work is not indicated but it is evident that the upper jaw may move downwardly and a flexible conductor 28 is provided to conduct current thereto. In this showing that portion of the primary 2 is indicated as the left hand lower coil and on it is supported, but of course insulated therefrom, the secondary 4. An interleaving of the secondary turns with the primary turns of that portion adjacent the same should be utilized to reduce leakage reactance. The upper end of the secondary 4 is connected to the upper flexible conductor 28 and thence to the electrode 6, the lower end of the secondary 4 is connected through laminated copper conductor 30 to electrode 8. The dummy primary winding 20 is shown lying on the opposite sides of the main portion of the primary 2 and crossing the same at the rear and thus producing a magnetic field at right angles thereto. It will be evident from this application that a relatively large throat, small and comparatively portable welder can be provided with this type of construction.

We claim:

1. In transformer means, a primary winding having substantially a rectangular turn configuration with one part bent back to lie in non-inductive relation to the other and to provide an opening into which material may be passed, a secondary winding of the approximate size and configuration of the first part of the primary and mounted in close proximity thereto so that there will be high mutual inductance coupling between the secondary and that part of the primary adjacent thereto and substantially no flux interlinkage with the other part of the primary.

2. In transformer means, a continuous primary winding having crossed sections in substantially non-inductive relation with an open end into which material may be passed, a secondary winding in close proximity to one section of the primary winding only and having high mutual inductance therewith, a pair of contacts supported within the open end of the primary winding and connected to the secondary and between which the material may be passed.

HAROLD C. EARLY.
WILLIAM G. DOW.

REFERENCES CITED

The following references are of record in the file of this patent:

UNITED STATES PATENTS

| Number | Name | Date |
|---|---|---|
| 1,103,041 | Fulda | July 14, 1914 |
| 1,301,636 | Arnold | Apr. 22, 1919 |
| 1,312,845 | Gravell | Aug. 12, 1919 |
| 1,672,702 | Weld | June 5, 1928 |
| 1,953,773 | Richart | Apr. 3, 1934 |
| 1,986,512 | Meadowcraft | Jan. 1, 1935 |
| 2,407,282 | Johnson | Sept. 10, 1946 |

FOREIGN PATENTS

| Number | Country | Date |
|---|---|---|
| 604,884 | France | Feb. 6, 1926 |